March 13, 1956 G. A. LYON 2,738,233
WHEEL COVER
Filed Oct. 11, 1952
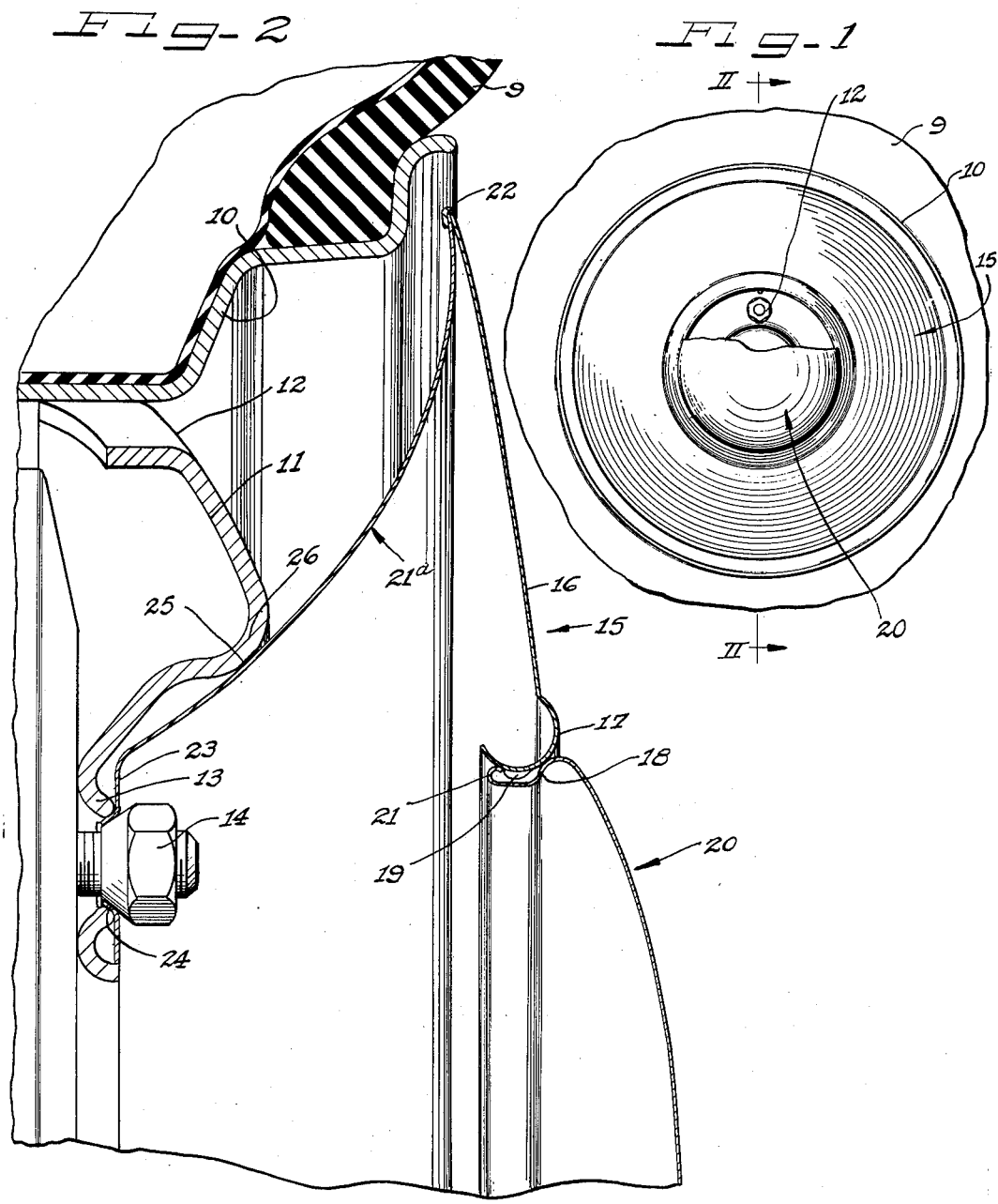
Inventor:
George Albert Lyon
by Hill, Sherman, Meroni, Gross & Simpson
Attys

UNITED STATES PATENT OFFICE 2,738,233
Patented Mar. 13, 1956

2,738,233
WHEEL COVER

George Albert Lyon, Detroit, Mich.

Application October 11, 1952, Serial No. 314,362

1 Claim. (Cl. 301—37)

This invention relates to wheel structures and more particularly to a detachable cover for an automobile wheel.

At the present time, there is a marked tendency in the automotive industry to accentuate the wheel particularly from the standpoint of giving it a more massive appearance. To this end, it becomes desirable to provide a wheel cover which lends itself to a number of different shapes and yet which, when on the wheel, will give the wheel a more massive appearance from the standpoint of the depth of the wheel.

An object of this invention is to provide a wheel cover which will meet this trend in the automobile industry and yet which is simple and economical to manufacture.

Still another object of this invention is to provide a multi-part wheel cover which is strong in construction by reason of the multiple thickness of material afforded by the parts and in which the axially outer part can be given any desired shape without necessitating changing of the inner or attaching part.

In accordance with the general features of this invention there is provided in a cover structure for a wheel including a multi-flanged tire rim and a central body part having attaching bolt means for detachably securing the wheel on an axle, a multi-part wheel cover including axially outer and inner parts connected together at their outer peripheries so as to be integral and diverging radially inward from their peripheries in spaced relationship, the inner part having a central flange engageable by the wheel bolt means to detachably secure the cover on the wheel, and a hub cap in the center of the outer cover part detachable to afford access to said bolt means.

Another feature of the invention relates to forming the connection between the parts by a simple lock seam which can be spaced from the tire rim to permit air to circulate between the cover and the rim.

Other objects and features of this invention will more fully appear from the following detailed description taken in connection with the accompanying drawings which illustrate a single embodiment thereof and in which:

Figure 1 is a fragmentary side view of a wheel structure embodying the features of this invention and showing the central hub cap broken away;

Figure 2 is an enlarged fragmentary cross-sectional view taken on the line II—II of Figure 1 looking in the direction indicated by the arrows.

As shown on the drawings:

In the drawing I have illustrated a more or less conventional automobile wheel such as has been commonly used for many years on American make cars. It includes the usual pneumatic tire and tube assembly 9 carried on the conventional well-known multi-flanged drop center type of tire rim 10. This rim 10 is, in turn, carried by a central body or spider part 11 which, as is well known, is usually apertured adjacent the rim to provide air openings 12.

The central portion of the body part 11 is indented and formed into an apertured flange 13 cooperable for conventional bolt means or assemblies 14 for detachably fastening the wheel on a part of the automobile axle.

My invention is directed to providing a multi-part cover cooperable with a wheel of the aforesaid character and I have designated such a cover generally by the reference character 15. It includes a sheet metal outer bulged part 16 having a central annular bead 17 which includes an inwardly turned portion 18 defining a seat for a metal hub cap 20. The portion 18 has a plurality of circumferentially spaced radially inwardly projecting protuberances 19 adapted to cooperate with a turned flange 21 of the hub cap 20 in detachably holding the hub cap in the center of the cover. The particular means for holding the hub cap 20 is not specifically a part of my invention and may, of course, be of any suitable type as long as the hub cap is detachable to afford access to the bolt means 14.

The other and axially inner part 21a of my wheel cover is connected or lock seamed at its outer peripheral edge or peak at 22 to the outer peripheral edge of the outer cover part 16. It will be perceived from Figure 2 that the two parts 16 and 21a diverge radially inwardly from the connection 22 so that they are progressively spaced from each other toward the center of the wheel. This enables the positioning and location of the central portion of the outer cover part 16 axially outwardly beyond the confines of the rim 10. By this feature I am enabled to give the wheel a more massive appearance from the standpoint of depth and to accentuate quite substantially the center of the wheel.

The inner cover part 21a is progressively curved axially rearwardly and merges into a central flange 23 for disposition inside the center of the wheel body part 11. This central flange has a series of apertured portions 24 cooperable with the bolt means 14 for detachably holding the cover on the wheel. If it is so desired a portion of the cover 21a at 25, adjacent but spaced from the bolt means 14, may be bottomed against the nose 26 of the part 11.

Both cover parts 16 and 21a lend themselves to economical manufacture on a large production scale from metal stampings or the like. In addition, the outer cover part 16 can be given any one of a number of different desirable ornamental shapes without necessitating changing of the construction of the inner part 21. Further, it will be appreciated that the hub cap 20 can likewise be given any number of different shapes without requiring any change in the construction of the cover.

Attention is also directed to the fact that the connection 22 between the parts is spaced from the flanges of the rim 10 so that air can circulate freely between the cover and the rim as well as behind the cover.

I claim as my invention:

In a wheel structure for a wheel including a multi-flanged tire rim and a central body part having attaching bolt means for detachably securing the wheel on an axle, a multi-part generally hollow wheel cover including axially outer and inner divergent parts connected together at their outer peripheries in a peripheral peaked edge adjacent to but spaced from the tire rim so that air can circulate freely between the cover and the rim as well as behind the cover, said cover parts being integral and diverging radially inward from said peripheral peaked edge in spaced relationship, said inner part having a central flange engageable by said wheel bolt means to detachably secure the cover on the wheel, and a hub cap in the center of said outer cover part detachable to afford access to said bolt means, said inner cover part being bottomed on the wheel body part between said peaked edge and said central bolt on flange.

References Cited in the file of this patent

UNITED STATES PATENTS

| 2,031,092 | Begg | Feb. 18, 1936 |
| 2,190,669 | Lyon | Feb. 20, 1940 |